UNITED STATES PATENT OFFICE.

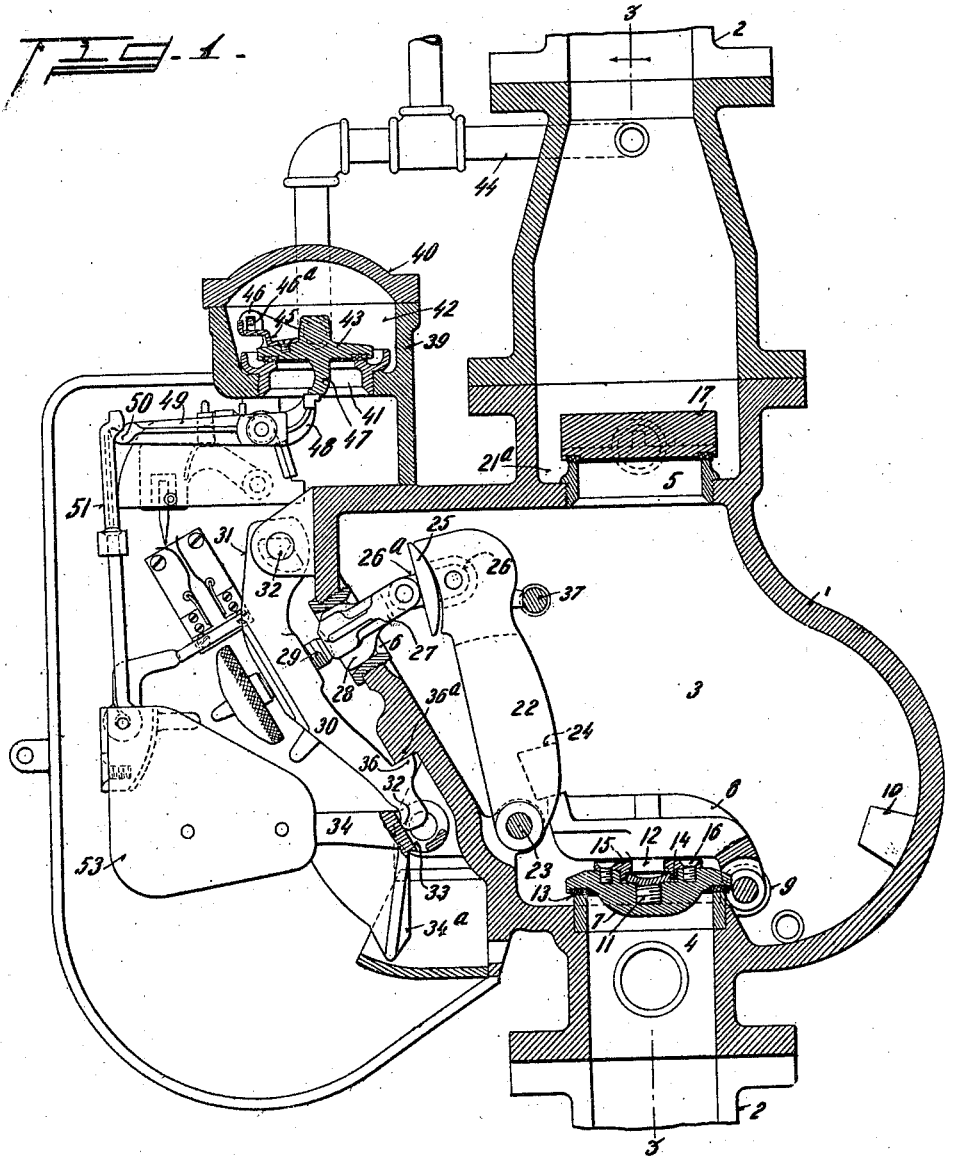

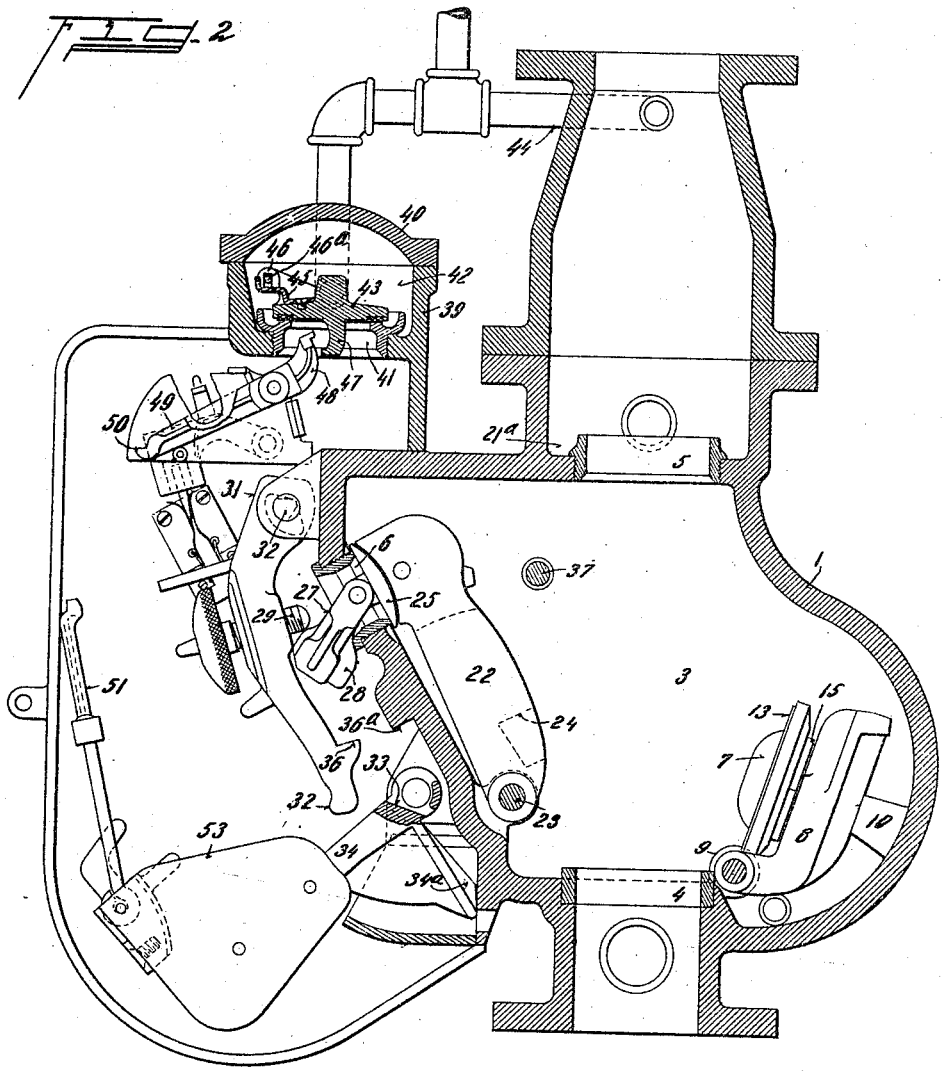

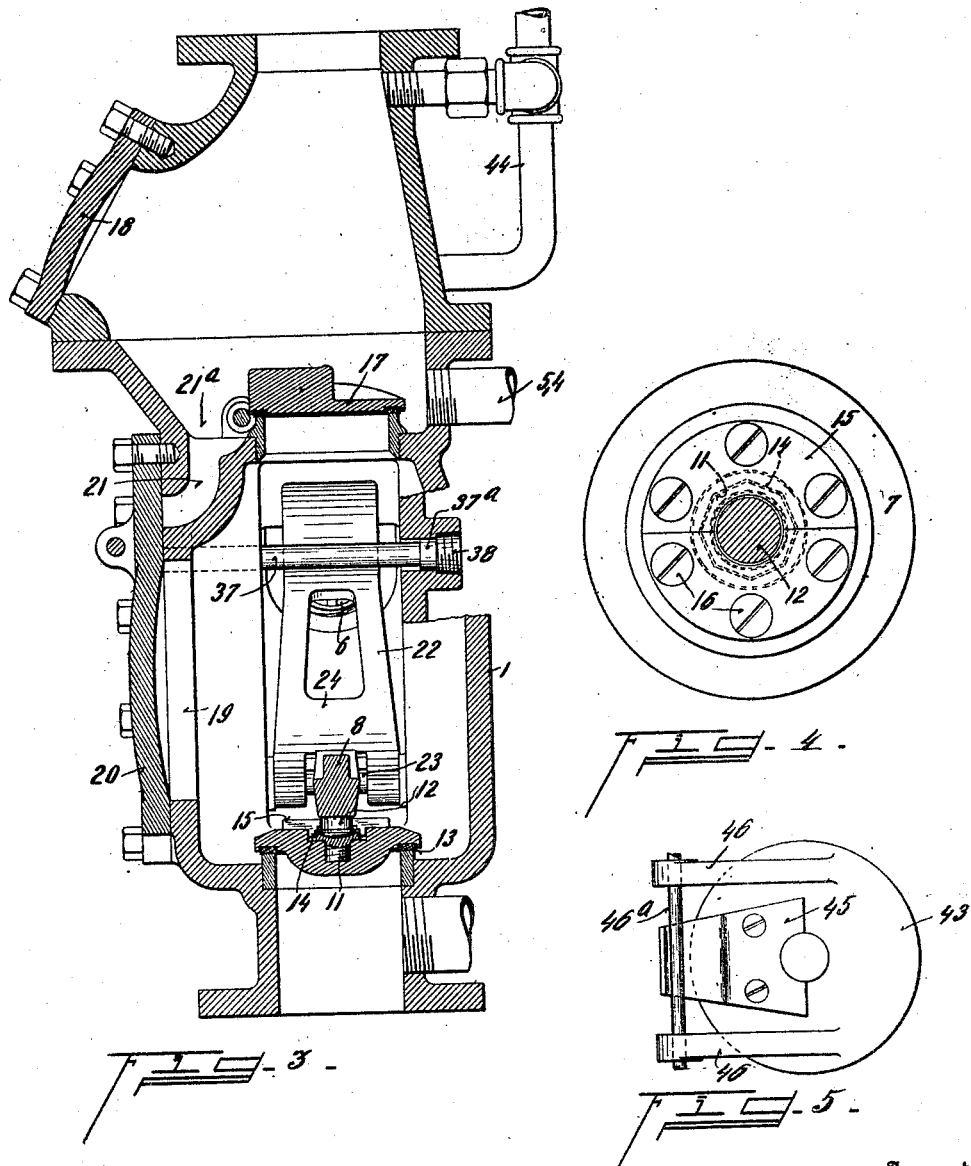

CHARLES B. GARRETT, OF CINCINNATI, OHIO, ASSIGNOR TO THE GLOBE AUTOMATIC SPRINKLER COMPANY, OF CINCINNATI, OHIO, A CORPORATION OF OHIO.

DRY-PIPE VALVE.

1,189,805.

Specification of Letters Patent.

Patented July 4, 1916.

Application filed January 26, 1914. Serial No. 814,306.

*To all whom it may concern:*

Be it known that I, CHARLES B. GARRETT, a citizen of the United States, and residing at Cincinnati, in the county of Hamilton and State of Ohio, have invented a new and Improved Dry-Pipe Valve, of which the following specification is a full disclosure.

My invention relates to a dry pipe fire extinguishing system and particularly to the valve known as the "dry pipe valve," which is an automatic device designed to hold back the water until the air pressure in the system has been reduced as by its escape through the opening of a sprinkler head.

The invention is to provide a dry pipe valve primarily of straightway type, having a water check valve, and an air check valve axially disposed, one above the other, an intermediate chamber between said valves under atmospheric pressure when the device as a unit is set or in normal operative position and an auxiliary check valve in what is known as an "air-pot". The water check valve is seated under a regulated pressure and released by trip mechanism controlled by differential pressure in the extinguisher system and non-affected by the water check valve seating pressure. The water check valve, therefore, may have a seating tension applied thereto three times greater than any probable water pressure without increasing to a material extent the tension or pressure on the tripping mechanism, and without requiring an increase in the normal air pressure in the system. Thus, the release or trip of the water check valve is effected at a definite fall of the air pressure in the system, irrespective of the tension or pressure required to seat the water check valve against the water pressure beneath it.

Therefore, an object of the invention is to provide a variable pressure for seating the water check valve practically invariable as to its automatic release.

Another object of my invention is to provide a dry pipe valve with a water check valve and an air check valve having their seat openings in axial alinement. A system of levers, for seating said water check valve under an excessive pressure, and an auxiliary air valve for tripping said lever system definitely governed as to its release, to automatically release the pressure on said water check valve after a predetermined reduction in the air pressure in the fire extinguishing system to which the dry pipe valve is connected, is provided.

Another object of my invention is to provide a system of levers or lever structure of such character whereby a sudden impulse of a preponderance of water pressure or water hammer will not impair the water check valve or accidentally trip it. The tensioning of the levers by a hand wheel operated screw, providing a rapid, powerful and convenient adjustment for producing a pressure upon the water check valve capable of resisting three times any probable water pressure encountered in service, is accomplished by the mere application of a person's hand and without the aid of an auxiliary appliance not a component of the lever system.

Another object of my invention is to provide non-mechanical means functioning inherently with the insertion or removal of a hand-hole cover or flange of the intermediate chamber between the water and air check valves in one instance to indicate the condition of the system as to whether it has been properly drained before resetting the dry pipe valve, and second, making it compulsory to replace the cover before the system can be restored to normal, or so maintained under the proper air pressure.

Another object of my invention is to provide a correlation between the various elements of the dry pipe valve rendering any one of them indispensable to assemblage, which also renders certain functions or operations imperative to a proper resetting of the valve, after tripping, thereby preventing erroneous assemblage and insuring a proper restoration of the system to normal.

Other objects of my invention relate to the construction of the water check valve, air check valve, auxiliary air valve, and various other components of the dry pipe valve as a unit, when used as an automatic appliance for fire protection, safe-guarded against negligence in a setting or resetting of the dry pipe valve or the negligence as to the performance of certain steps or omission of parts which might impair the operativeness of the system.

Other objects will be in part obvious from the annexed drawings and in part indicated in connection therewith by the following analysis of this invention.

This invention accordingly consists in the features of construction, combination of parts, and arrangement of elements deducible herefrom, and in the unique relation of the members and in the relative proportioning thereof; all as more completely outlined herein.

To enable others skilled in the art so fully to comprehend the underlying features thereof that they may embody the same by numerous modifications in structure, relation, steps and sequence thereof contemplated by this invention, drawings depicting a preferred form have been annexed as a part of this disclosure, and in such drawings, like characters of reference denote corresponding parts throughout all the views, of which:—

Figure 1 is a central vertical section through the dry pipe valve, illustrating the parts in their set position. Fig. 2 is a similar section as that of Fig. 1, illustrating the parts in their tripped or released position. Fig. 3 is a transverse section, taken on line 3, 3, Fig. 1. Fig. 4 is a top plan view of the water check valve. Fig. 5 is a top plan view of the air trip valve.

The use of the term "valve" or "dry pipe valve" herein refers to or should be defined as meaning the structure as a unit, while those elements qualifying as valves, will be specifically denominated to avoid confusion.

The valve consists of the main body or casing 1 interposed between and forms a part of a vertical conduit or riser 2 of the fire extinguishing system and provides an intermediate chamber 3, open to the atmosphere, when the valve is set or normal. The body is formed with three valve seat equipped openings, 4, 5, 6. 4 represents the water intake or inlet, and 5 the water outlet from the valve to the system. The opening 6 leads to the atmosphere and provides a passage for entry into the intermediate chamber, in the connecting elements of the lever system, which opening is automatically sealed when the valve is tripped or when the water passes through the system. The valve may be designated as a "straightway valve", in that the water inlet and outlet openings are in vertical axial alinement and preferably installed with the inlet at the base so as to have all water supply enter the system from below the valve. The straightway feature through the valve is important so as to minimize the pressure friction losses and to keep this passage clear when the valve is tripped. The various check valves and controlling levers or elements move in a direction with the flow of the water so that their functioning is aided by the pressure of the water and thereby offer no interference or resistance to impede the water flow. The straightway principle and maintaining its clearance in operation of the system, is a factor comprised in the novel features of this invention.

The water inlet check or clapper valve 7, and its hingedly mounted arm 8, herein illustrated, are of the preferred construction, to improve the construction of similar elements shown and described in my prior U. S. Letters Patent No. 831,054, dated September 18, 1906, and No. 865,880, dated September 10, 1907. The water inlet valve 7 is loosely mounted upon the arm 8, which is fulcrumed upon a bearing 9, within the intermediate chamber, and at one side of the valve seat opening 4. The wall or the body of the casing 1, opposite the valve, is recessed to receive the valve and its arm when swung to their open or tripped position, to position the same beyond the seat opening, so as not to obstruct the flow of the water and also to prevent the valve automatically closing when it has been moved to its complete open position. The casing or body 1 is provided with a stop lug 10, which is engaged by the arm 8, when swung to its abnormal position. The valve is centrally provided with an adjusting screw 11, having a concaved head to receive the convex head of the boss 12 projected from the arm 8, forming a knuckle connection for flexibly or hingedly mounting the valve to the arm so that the sealing pressure from the lever system is brought axially upon the valve equalizing the pressure annularly upon the seat. This also provides means for adjusting the bearing point or surface 12 of the arm or rocking lever 8 relative to its compression lever, so as to bring the arm bearing surface to a definite location or position after refacing the metal packing ring 13.

The contour of the adjusting screw 11, see Fig. 4, is of polygonal form, adapted to be engaged within a correspondingly shaped recess of the boss 14 projected from the split nut-lock member 15, removably secured to the upper surface of the valve 7, by the screws 16. The nut-lock member is concentrically apertured to receive the shank portion of the boss 12 in securing the valve to the arm or rocking lever 8. The nut-lock member therefore provides a gland for connecting the valve and rocking lever and a lock for the screw. The use of all parts is essential for a proper setting of the valve and cannot be dispensed with or erroneously applied.

The water outlet or air check valve 17 is of swing type hingedly mounted upon a fulcrumed bearing, positioned upon one side of the seat opening 5, with provision made in the casing 1 to permit the valve to swing rearwardly beyond its vertical center of gravity to prevent its automatic closing when once completely opened. As an initial safeguard, the valve is weighted toward its fulcrum. Thus, after the valve has been opened by the water pressure sufficiently to throw it to a vertical position, the weight is sufficient to overcome any balance, and thereby cause the valve to fall backward against the casing, rendering it compulsory to manually reseat the valve. It also places the valve in a position beyond the water passage or course. This also renders compulsory draining of the system before resetting. The casing above the valve is provided with a hand-hole and cover flange 18 for access to the valve. This valve is not encumbered with any lever connections, an auxiliary valve being provided for controlling the tripping of the water check valve, and is normally held to its seat by the air pressure in the system above the same. It is an object in the design of this invention to reduce to a minimum moving elements within the dry pipe valve proper for clearance purposes; to produce a free water passage.

The intermediate chamber 3 is accessible through the handhole 19, sealed by the cover flange 20.

Dry pipe systems are primarily installed in buildings which cannot be properly heated, or exposed to the weather, which necessitates proper draining of the system before setting or resetting of the valve to avoid freezing. The resetting is manually accomplished by access into the intermediate chamber upon the removal of the cover flange 20. This would not be practical if the system were not drained and the air check valve opened for the water in the system would escape through the hand-hole 19, in fact, the mere loosening of the cover flange would cause a leakage of water and indicate to the operator that he had failed to previously drain the system. I have provided additional water indicator means effective upon loosening or removing the cover flange 20, should instances occur wherein the water pressure was not great enough to fully open the air check valve 17 and permit its automatic reseating, sealing against any reverse flow of the water in the system. This I accomplish in a unique manner without the aid of auxiliary mechanical appliances, and which is positive and never failing in its action. Its functioning is inherent with the removal and insertion of the cover flange 20, which must be removed before the water check valve and lever system can be reset, and must be securely applied before the system can be put under air pressure. Its secure application is essential to avoid water leakage when the system is in operation and made imperative under normal conditions to prevent the escape of air, for such air escape would require a constant operation of the air pump to the expense of the owner. These advantages are accomplished in providing a passage 21, see Fig. 3, in communication with the system at the base of the priming chamber 21$^a$ of the dry pipe valve, independent of the air check valve seat opening or air check valve, or it may be said that the passage communicates with the base of that portion of the sprinkling system confining air under pressure. This passage leads downwardly and forwardly above the intermediate chamber and terminates with the plane surface receiving the cover flange of the intermediate chamber 3 and its control had by the cover flange, which projects beyond the hand-hole 19, utilizing an integral cover for sealing two openings. This, however, is merely a preferred form, as other means could be provided for sealing said passage positively operated upon inserting or removing the cover flange 20.

The lever system for locking the valve lever 8 and its water check valve under a pressure three times any possible water pressure and controlled by a hand wheel operated screw without approximately adding any increase of tension to the tripping mechanism or air seated valve is comprised by the following members:—Within the intermediate air chamber 3, I provide a rocking lever 22, one end pivotally mounted between the wall of an offset portion of the casing 1 and fulcrumed upon a pin 23, secured within the walls of the casing. The lever 22 is provided with a strut 24 adapted to engage with the free end of lever 8. The opposite end of the lever 22 has a valve 25 pivotally connected therewith, said valve under abnormal conditions engaging the seat opening 6. The valve also qualifies as a link and is provided with the opposingly projected ears 26, 26$^a$, the ear 26 pivotally connected to the lever 22, and the ear 26$^a$ pivotally connected with the strut 27, which projects through the opening to the atmosphere of the intermediate chamber. The surface of the valve 25 adjacent the lever 22 is of convex form, adapted to be received by a correspondingly curved concave surface of the lever 22. This provides for sufficient resiliency of the valve for its proper self-seating and functions as a knuckle-joint when the valve functions as a link in the lever system to relieve the fulcrum pin of undue pressure. The strut 27 is of peculiar construction to offer strength and rigidity, and its free end is weighted by a lug projection 28 which also serves as a guide and support to center the strut with the hand operated screw 29, screw-threaded upon and projected intermediately through the setting lever 30, exterior of the intermediate chamber. The end of the screw 29 has a socketed engagement with the end of the strut 27, which is provided with a concave recess for free separation of the elements when the lever system is collapsed or tripped. The fulcrum end 31 of the setting lever 30 is provided with a sector-shaped aperture for receiving the knife edged fulcrum pin 32 secured to the exterior of the intermediate chamber or casing 1 to provide a scale bearing for the lever. The opposite end of the lever 30 is provided with a knuckle 32 adapted to engage with an inclined surface 33 of the weighted lever 34, said weighted lever being pivotally mounted upon the exterior of the casing. The fulcrum end of the weighted lever 34 is forked, with the setting lever engaged between the limbs thereof, which secures the free end of said setting lever against lateral movement. The weighted lever 34 is provided with a transverse projection 34$^a$ serving as a bumper and limits the release movement. The setting lever 30 is also provided with a lug 36 adapted to engage with an opposing lug 36$^a$ projecting from the casing to resist any flexing tendency of the setting lever when applying the water check valve seating pressure, but which does not oppose any collapsing movement of the lever system when tripped. It also insures the proper registry of screw and strut, safeguarding against any inappropriate relative positioning of the elements in resetting due to the loose fulcrum of the setting lever 30.

It will be observed that by the compound system of leverage, namely, levers 8 and 22, the power of force required at the free end of lever 22 to exert three times the probable water pressure against the water check valve is comparatively small and in proportion to about one to sixteen. This is again reduced by the correlation between the setting lever and weighted lever to relieve the weighted lever and make it comparatively a constant factor in its governor-like action for its definite tripping function. Thus on one side of the weighted lever, with said lever regarded as an intermediary of the system of leverage, we have a definite and approximate invariable condition, while on the other side an indefinite and variable condition in pressure. That is, the air-pressure is maintained at a fixed or definite degree, usually thirty pounds to the square inch, whereupon it is desirable to trip the lever mechanism when the air-pressure in the system falls or is reduced to about eleven pounds per square inch. Therefore, being a definite factor, it may be said to be invariable for the purposes herein. On the other hand, the service pressure varies in different localities and also at times in the same locality, and the water-check valve unit must withstand the various pressures in its sealed condition and not cause a tripping of the valve. With my system of leverage, such variable conditions in service pressure have comparatively no influence upon the weighted lever to make any perceptible change in its functioning at a proper interval upon a fall or decrease of air pressure in the system. In fact, the construction of the coupling between the setting lever and the weighted lever and the reverse force of the valve seating pressure, tends to assist in the release rather than to retard the same. This enables a very accurate setting and one that can be relied upon and enables the provision of a dry-pipe valve for universal use, irrespective of the water pressure encountered in service. The operator, in resetting the valve, is not called upon to make any delicate adjustments, the screw 29 being the only adjustable element operated and this cannot be excessively adjusted to disturb the tripping mechanism or tensioned beyond a maximum point.

The lever 22 is positioned so that it will fall by gravity toward the opening to the atmosphere of the intermediate chamber in the collapsing movement of the system of levers whereby the opening will be closed by the flying valve 25, should water pressure not be present underneath the water-check valve 8. The lever is also limited in its forward or pressure imparting movement by the rod 37 supported within the casing which cannot be removed and must be in place when the cover flange is secured in position, see Fig. 3.

The means for providing non-removability of the rod 37 comprises a head 37$^a$ of larger diameter than the rod, with the core in one wall of the casing of a diameter only to receive the rod, while the opposing wall is bored to receive the head. Thus, the rod can be removed toward the cover flange for lever clearance, but cannot be withdrawn from the casing and must be returned to a lever limiting position before applying the cover. The bore at the head end of the rod is sealed toward its exterior end by a plug screw 38, which is not accessible with ordinary hand tools. The rod 37 provides a limit of movement of the lever 22 toward its valve tensioning movements.

The valve tripping mechanism is comprised by the following instrumentalities: An air-pot 39 is securely supported upon the body or casing 1, or may form an integral part thereof. It is provided with a removable cover 40, and at its lower portion with a valve seat equipped opening 41, and a trip valve 43. The chamber 42 of the air-pot is in communication with the air-chamber above the air-check valve through the piping 44 to establish an equilibrium in pressure between said chambers. This disposes the air-pot as subsidiary to the dry-pipe valve to maintain its straight way or course and places all tripping or controlling parts outside of the casing 1, for the lesser number of movable parts within the casing, reduces the possibility of clogging the valve or impeding the flow of the water. Such feature finds favor with insurance organizations, inspecting and approving devices of this class, but its subsidiary position is one of choice and not strictly material to the operation of the device, and therefore do not wish to be limited thereto, except as particularly set forth in the claims. The air trip valve could be in direct communication with the air chamber of the dry-pipe valve within the province of this invention. The air trip valve 43 is pivotally supported within the chamber 42, in a preferred manner, to provide an equalized or substantially uniform movement annularly in its opening movement. It is provided upon its upper surface with the arms 46 slotted to receive the pin 46ª fixed in the walls of the air-pot which enables the valve to move vertically in a horizontal plane upon its fulcrum when raised under the influence of the weight beneath until the pin is engaged by the limb 45 fixed to the valve intermediate the arms 46, wherefore the valve will swing upon its fulcrum. Such mounting to the valve produces a compound action, that of raising and swinging to bring about the trigger release of lever 49 within a limited movement of the valve, to allow the end of the arm 48 of the lever 49 to swing beyond the end of the finger 47. The end of the lever arm and finger is formed with opposing catch projections to prevent a resetting of the lever without manually raising the valve. The manual raising of the valve is a qualification imposed to compel a removal of the cap 40 which serves to impliedly remind the operator that inspection of the valve seat is a requirement for each resetting.

The lower surface of the valve 43 is provided with a depending trigger finger 47 normally engaged with the arm 48 of the trip lever 49, which is pivotally mounted upon the base of the air-pot. The opposite arm of the trip lever 49 has a hook end 50 normally engaged with a connecting rod 51. The opposite end of said rod is pivotally connected to the weight 53 of the weighted lever 34. The connection is made by forming an eye in the connecting rod, engaging with a pin in the weight. Thus, whenever the air pressure in the system is reduced to a predetermined degree from the opening of a sprinkler head, or equivalent escape, it permits the trip valve to raise under the influence of the weight 53, overcoming the air pressure within the system. The valve moves sufficiently to permit the arm 48 of the lever 49 to disengage from the valve trip finger 47. This will cause a descending movement of the weighted end of the lever, disengaging from the connecting rod, so as to require manual resetting after tripping. The collapsing of the tripping elements from their serial connection releases the air trip valve, so as to permit it to immediately or quickly reseat itself by gravity, before the influence of the service pressure reaches it, so as to have the same seal against a leakage of water.

*Valve setting or re-setting.*—The valve is set or re-set by first draining the system, provision for draining being provided usually through a pipe communicating through the casing of the dry pipe valve above the port of the air check valve 17, a pipe 54 for such purposes being illustrated in Fig. 3. This is an essential requirement in dry pipe systems, for no water must be contained in the system above a priming point to insure against freezing. This initial draining is made imperative by reason of the passage 21 having its exit sealed by the cover-flange 20. The cover-flange must be removed before access can be had to the water check valve which can only be manually closed. After the system has been properly drained the cover-flange 20 is removed and the air check valve 17 seated and likewise the water-check valve. The cover-plate 40 of the air-pot is also removed so that the valve 43 can be sufficiently raised so as to permit the tripping lever 48 to be engaged beneath the finger 47. This positions the valves, whereupon the cover plates are replaced, and priming water poured into the valve above the air check valve 17 to a requisite height called for under insurance regulations. The air-pump of the sprinkler system is then put into operation to raise the required air pressure within the system, which seats the trip valve 43 under pressure excessive of the weight or tripping pressure of the tripping mechanism. The compression lever 24 is then swung from the exterior of the valve to engage with the lever 8, moving the strut member 27 in position to engage with the screw 29, after which lever 30 is normalized and held in position by the weighted lever 34 in swinging the latter upward and re-engaging the connecting rod 51 with the tripping lever 49.

The hand-operated screw 29 is then adjusted to bring the proper pressure on the water check valve to seal the same under an excessive pressure over the probable water pressure in the service supply.

It will be noted that the various elements of my dry pipe valve are designed to safeguard against careless resetting or the omission of parts in resetting, which might lead to an improper functioning of the valve and thereby reduce its efficiency as a fire protection appliance.

Without further elaboration, the foregoing will so fully reveal the gist of this invention that others can by applying current knowledge readily adapt it for various applications without omitting certain features that, from the standpoint of the prior art, fairly constitute essential characteristics of the generic or specific aspects of this invention, and therefore such adaptations should and are intended to be comprehended within the meaning and range of equivalency of the following claims.

Having thus described my invention, I claim as new and desire to secure by Letters Patent of the United States:—

1. A device of the nature disclosed, combining a casing forming a part of the conduit of a fire extinguishing system divided by valve-seat-equipped openings and valves therefor to provide an intermediate chamber, said chamber having a valve-seat-equipped opening to the atmosphere, a lever within said chamber fulcrumed upon said casing swinging by gravity toward said opening to the atmosphere, and adapted to forcibly seat one of said valves, and means united with said lever through said opening to the atmosphere for controlling said lever, including a valve to seal said opening during the valve releasing position of said lever.

2. A device of the nature disclosed combining a casing forming a part of the conduit of a fire extinguishing system, having a valve-seat-equipped opening as a service entrance and a valve therefor, a valve-seat-equipped opening to the atmosphere, a lever within said casing for forcibly seating said entrance valve, and a valve moving with said lever for sealing said opening to the atmosphere, said lever, when free, moving by gravity toward said opening to the atmosphere to automatically seal its valve.

3. A device of the nature disclosed combining a casing forming a part of the conduit of a fire extinguishing system having a valve-seat-equipped opening for service entrance, a valve therefor, a pair of oppositely disposed levers, one within the casing adapted at its fulcrum end to abuttingly engage with said valve for seating the same under pressure, and the second normally confined against movement, strut elements intermediate said levers, and hand operated means therefor for varying the distance between said levers to regulate the pressure upon said valve.

4. A device of the nature disclosed combining a casing forming a part of a conduit of a fire extinguishing system having valve-seat-equipped openings, one to the atmosphere and a second for service entrance, a valve for said service opening, a pair of opposing levers, one within the casing swinging upon a fixed fulcrum adapted at its fulcrum end to engage said entrance valve, and the second exterior of the casing normally confined against movement, strut elements intervening said levers, projected through said opening to the atmosphere adjustable to vary the distance between said levers to apply a regulated pressure upon said entrance valve, and a valve for sealing said opening to the atmosphere upon release of lever pressure upon said entrance valve.

5. A device of the nature disclosed combining a casing forming a part of a fire extinguishing system, having valve-seat-equipped openings, one to the atmosphere and a second for service entrance, a valve for said service opening, a lever for supporting and bridging said valve, a pair of levers, one within the casing adapted to engage said bridge lever and swinging by gravity toward said opening to the atmosphere, and the second lever exterior of the casing normally confined against movement, strut elements intervening said levers projected through said opening to the atmosphere adjustable to vary the distance between said levers to apply a regulated pressure upon said service entrance valve, and a valve for said first-named lever for sealing said opening to the atmosphere upon release of service entrance valve.

6. A device of the nature disclosed combining a casing forming a part of a fire extinguishing system, having valve-seat-equipped openings, one to the atmosphere and the second for service entrance, valves therefor moving for relative alternate opening and closing of their respective openings, a single lever fulcrumed within said casing for forcibly seating said second valve and supporting a valve for said opening to the atmosphere, a normally confined member opposing said lever and strut elements intervening said lever and confined member, having a hand operated screw for moving said lever in a valve pressure applying direction and unseating said atmosphere opening valve.

7. A device of the nature disclosed combining a casing forming a part of a fire extinguishing system, having valve-seat-equipped openings, one to the atmosphere and the second for service entrance, valves therefor moving for relative alternate opening and closing of their respective openings, a single lever fulcrumed within the casing for forcibly seating said second valve and supporting a valve for said opening to the atmosphere, a normally confined member opposing said lever and strut elements intervening said lever and confined member, having a hand operated screw for moving said lever in a valve pressure applying direction and unseating said atmosphere opening valve, and means for collapsing said strut element for an alternate valve control.

8. A device of the nature disclosed combining a casing forming a part of a fire extinguishing system having valve-seat-equipped openings, one opening to the atmosphere and the second a service entrance, a valve for each respective opening, a lever fulcrumed within said casing providing a swinging support for the valve controlling said opening to the atmosphere, and adapted to engage the service entrance valve for forcibly seating the same, and strut elements intervening between a normally rigid abutment and said lever having a hand operated screw for moving said lever and to apply its pressure to said valve, and means for collapsing said strut elements to reverse the control of said valve openings.

9. A device of the nature disclosed combining a casing forming a part of a fire extinguishing system, a valve therein, and means for normally seating said valve under pressure, comprising a lever fulcrumed to swing across said valve and axially engage the same, a pair of opposite levers, the first normally confined against movement, and the second engaged with the free end of said valve engaging lever, between the fulcrum and forward end of said lever, and screw-actuated strut elements intervening between said relatively opposite levers for swinging said second lever, and means for releasing said confined lever to collapse said strut element to release said valve.

10. A device of the nature disclosed combining a casing forming a part of a fire extinguishing system, a valve therein, and means for normally seating said valve under pressure comprising a lever fulcrumed to swing across said valve and axially engage the same, a pair of opposite levers, the first normally confined against movement, and the second engaged with the free end of said valve engaging lever between the fulcrum and forward end of said lever, and screw actuated strut elements intervening between said relatively opposite levers for swinging said second lever, and tripping means automatically controlled by the pressure within said casing for releasing said normally confined lever and valve.

11. In a device of the nature disclosed, a casing forming a part of a fire extinguishing system, an inlet valve for normally holding back the service supply, a lever within the casing for bridging and axially supporting said valve, a second lever within the casing adapted to engage said first lever, and a third lever normally confined against movement, hand-operated tension means, intermediate said second and third levers, a weighted lever having an inclined abutment for confining said lever, and air controlled means for holding and releasing said weighted lever to release said confined lever and valve of its lever tension.

12. A valve for a sprinkler system, comprising a casing having a water inlet for connecting with the water-intake pipe, a valve for said inlet, an opposing pair of levers in approximate parallelism, one fulcrumed within said casing connecting with said inlet valve, and the second exterior of the casing normally confined against movement, expansible strut devices projecting through said casing connecting said levers for applying pressure upon said inlet valve, and valve and lever mechanism influenced by the prevailing pressure within the system for holding and releasing said first-named levers.

13. A valve for a sprinkler system, comprising a casing having a water inlet for connecting with the water service pipe, a valve for covering said inlet, an opposing pair of levers fulcrumed at relative opposite ends, one fulcrumed within said casing connecting with said inlet valve, and the second exterior of the casing, expansible strut devices projecting through said casing connecting said levers for applying pressure upon said inlet valve, and valve and lever mechanism influenced by the prevailing pressure within the system including a lever having an inclined abutment adapted to be engaged by the exterior lever of said first-named pair of levers for setting and releasing said first-named levers.

14. A valve for a sprinkler system comprising a casing having a water inlet port connecting with the water inlet pipe, a valve therefor, a pair of levers in approximate parallelism, and oppositely fulcrumed, one within the casing and connecting with said valve, and the second exterior thereof, a strut and hand operated screw devices connecting said levers through said casing for separating said levers and applying seating pressure to said valve, and means for automatically releasing said levers.

15. A valve for a sprinkler system comprising a casing having a water inlet port connecting with the inlet pipe, a valve therefor, opposing levers, one within the casing connecting with said valve and the second exterior of the casing normally confined against movement, and strut and exteriorly accessible hand operated screw devices separably connecting said levers for functioning said interior lever to apply a seating pressure to said valve.

In witness whereof, I hereunto subscribe my name, as attested by the two subscribing witnesses.

CHARLES B. GARRETT.

Witnesses:
A. B. GOULD,
B. P. WALKER.